United States Patent [19]
Hoeltgen et al.

[11] 3,928,195
[45] Dec. 23, 1975

[54] LIQUID PURIFYING PROCESS

[75] Inventors: James B. Hoeltgen; Harold E. B. Humphrey, both of East Lansing, Mich.

[73] Assignee: Kelmik, Inc., East Lansing, Mich.

[22] Filed: Oct. 7, 1974

[21] Appl. No.: 512,614

Related U.S. Application Data

[63] Continuation-in-part of Ser. No. 317,798, Dec. 22, 1972, abandoned.

[52] U.S. Cl. .................. 210/49; 210/51; 210/53
[51] Int. Cl.$^2$ ............................................. C02B 1/20
[58] Field of Search ............ 210/42, 49, 45, 47, 50, 210/51, 52, 53, 18, 46

[56] References Cited
UNITED STATES PATENTS

| | | | |
|---|---|---|---|
| 1,680,506 | 8/1928 | Derr | 210/46 |
| 2,217,466 | 10/1940 | Baylis | 210/52 |
| 2,241,641 | 5/1941 | Magill | 210/51 |
| 2,444,774 | 7/1948 | Hay | 210/51 |
| 2,964,466 | 12/1960 | Farnham | 210/52 |

FOREIGN PATENTS OR APPLICATIONS

| | | | |
|---|---|---|---|
| 1,358,224 | 3/1964 | France | 210/52 |

*Primary Examiner*—Charles N. Hart
*Assistant Examiner*—Benoit Castel
*Attorney, Agent, or Firm*—Price, Heneveld, Huizenga & Cooper

[57] ABSTRACT

A filtration process for purifying liquid systems, especially waste waters, comprising the sequential combination of a soluble aluminate, a soluble silicate, and a soluble ammonium ion source or a soluble di- or trivalent cation source in the liquid system with agitation, followed by filtration of the solids from the liquid system.

14 Claims, No Drawings

LIQUID PURIFYING PROCESS

CROSS REFERENCE TO RELATED APPLICATION

This is a continuation-in-part of parent Pat. application 317,798, filed Dec. 22, 1972 and now abandoned.

BACKGROUND OF THE INVENTION

This invention relates to a process for purifying liquid systems, especially waste waters.

Turbid waters, heavy suspensions, and sludges are by-products of our industrial society which currently have a commercially low value and are presently discarded. The concern for environmental protection and the depletion of natural resources, including available fresh water, complicates disposal of waste by-products and creates a need for storage, recovery, or reuse of such materials.

Many types of liquids contain organic and inorganic suspended solids and solutes which must be removed before these liquids are suitable for many industrial or domestic applications or are safe for return to the environment. The nature and concentration of such suspensions vary widely.

Waste treatment systems typically involve the introduction of chemicals to effect precipitation, coagulation or flocculation so as to hasten settling of impurities to the bottom of a liquid waste settling tank or settling basin. While ion exchange systems have also been employed, settling of the solids is probably the most widely used type of system. One example of such a system involves the addition of lime to raise the pH of the system and cause precipitation of some soluble materials. Excess lime may cause the particles of precipitates to combine in a mass that settles out of the solution more quickly. Another type of system involves the addition of a source of soluble iron (III) or aluminum (III) together with pH adjustment by lime to precipitate ferric hydroxide (iron (III) hydroxide) or aluminum hydroxide. The hydrous oxides of iron and aluminum are gelatinous and voluminous, and settle at a moderately rapid rate. Materials precipitated by lime are trapped along with other suspended solids to form a floc. This floc is removed from the water primarily by sedimentation. The clearer liquid above the sedimentation is then decanted off. That which is left behind is a highly concentrated suspension or sludge.

Much prior art work has been directed towards creating systems which hasten the settling or sedimentation process. However, these systems suffer the drawback in that the highly concentrated suspensions (sludges), especially those containing metals and non-metal synthetic compounds, are especially difficult to handle and some are potentially dangerous. Movement, handling, treatment, and disposal of sludges and dense suspensions are complicated by the large quantity of entrapped or entrained liquid, usually water. Moreover, the wide range of concentrations, e.g., 1–700,000 ppm settleable solids (as used herein "settleable solids" refers to settleable solids as measured by the Imhoff cone method), and the presence of entrapped or entrained water in wastes render simple treatment by any single known process inefficient, prohibitively expensive, complicated, or impossible.

Chemical treatment also is typically dependent on the nature of the waste to be treated and its concentration. Few existing chemical processes are universally applicable to the full range of wastes, and all produce a sludge which must be handled. As noted above, chemicals such as calcium oxide, calcium carbonate, alum, ferric chloride, sodium aluminate, and the like are used singly or in combination with polyelectrolytes to precipitate particles and foreign matter from water. The resulting close-pack arrangement is separated from water slowly, requiring the use of settling tanks or flotation tanks. Due to the length of time required for such solid-liquid separation, secondary reactions and further bacterial growth can occur, reducing attainment of maximal purification of the liquid. With certain wastes in high concentrations, settling and mechanical purification are very difficult making liquid purification nearly impossible. The primary objective of a universal purification process should be the maximum purification of the liquid and recovery of maximally dense dewatered solids from wastes of any composition and concentration.

The current methods of waste treatment also employ a combination of biological and chemical methods. Although biological treatment is a natural process, it is not predictable nor consistent, requires dilute suspensions, requies commitment of large land areas, is not applicable to water purification, cannot handle certain types of wastes which are toxic to a biological process, and produces a heavy sludge which must be removed and may contain toxic materials.

SUMMARY OF THE INVENTION

Whereas prior artisans have concentrated on developing systems which improve the settleability of solid impurities, the present invention actually interferes with the settleability of waste impurities. Surprisingly, however, the process of the present invention renders a wide variety of impurities highly filterable. Whereas prior art settled sludges filter very slowly and quickly gum up any type of filtration media, the present invention creates a system which can be readily filtered and which does not gum up the filtration system. Further, the process is surprisingly universally applicable on such systems as aqueous suspensions, sludges, slurries and solutions of domestic, agricultural and industrial wastes of a wide variety.

The process yields a liquid which is substantially free of particulates and many organic and inorganic solutes, including harmful micro-organisms, which liquid is suitable for domestic and industrial purposes, for further refinement, or for return to the environment. Further, the process yields a highly dewatered unique complex of recovered solids which can be safely stored, handled, and beneficially used. The process is rapid, economical, and utilizes commonly available chemicals.

The process of the present invention comprises sequentially introducing a soluble aluminate, preferably an alkali aluminate such as sodium aluminate, a soluble silicate, preferably an alkali silicate such as sodium silicate, and a soluble ammonium ion source or a soluble di- or trivalent cation source, preferably a soluble di- or trivalent metal salt such as calcium chloride, with agitation into the liquid system to be treated, preferably an aqueous system. The resulting unique complex of the recovered solids is then separated from the liquid by filtration. From about 0.004 to 0.04 moles of available soluble aluminate, from about 0.006 to 0.2 moles of available soluble silicate, and from about 0.001 to 0.2 moles of available soluble ammonium ion source or soluble di- or trivalent cation source should be combined in the liquid system to be treated for every liter of the liquid system. As used herein "soluble" means soluble in the liquid of the system being treated. Further, as used herein, "aluminate", "silicate", and "ammonium ion source" and "cation source" includes mixtures of the aluminate, silicate and ammonium ion source and/or cation source respectively.

DESCRIPTION OF THE PREFERRED EMBODIMENTS

The process of the present invention is suitable for purifying a variety of liquid systems, including aqueous and certain organic liquid systems. For example, the process has been successfully used to purify waste water containing sewage, plating wastes, pharmaceutical wastes, paper processing wastes, and water-soluble cutting oil wastes. In fact, the process is believed to be effective for purifying any kind of waste waters with very low to very high waste concentrations and very high settleable solids concentrations, e.g. between 1 and about 900,000+ ppm settleable solids. Surprisingly, the operability of the process and the process parameters are not dependent upon the particular type of waste nor the concentration thereof.

The first chemical employed in the process of the present invention is a soluble aluminate. Although any soluble aluminate can be used with satisfactory results, it has been found that best results are achieved with a soluble alkali aluminate, with sodium aluminate being especially preferred in aqueous systems. It is preferable to use a fairly concentrated solution, e.g. 5–9 molar since this minimizes the volume of liquid to be filtered. However, it can be added as a solid or in more dilute solutions and a satisfactorily filterable product still obtained.

The second chemical employed is a soluble silicate. While any soluble silicate is suitable for use in the process, an alkali silicate is preferred as yielding optimum results, with sodium silicate being especially preferred in aqueous systems. The concentration and pH of the silicate solution which is to be added to the waste system are important relative to one another. In order to be effective at a neutral or basic pH, the concentration of the silicate solution must be from approximately 5 molar. If the solution is diluted by a factor of 10 without acidification, introducing it into a waste system even in proper sequence with the aluminate and di- or trivalent cation source does not yield optimum results even if the total molar amount added is the same as would be added in a more concentrated solution. However, good results are obtained with the more dilute solutions provided the more dilute solutions are made slightly acidic. This concentration can be reduced by a factor of 10 so long as the solution is acidified slightly. The drawback of using more dilute acidic solutions are that the solutions must be used quickly, in that they are unstable, and a large volume of liquid will ultimately have to be filtered. Thus, the 5 molar solution is far preferable in the case of this reagent. It is not available in solid form as are the other chemicals.

The third chemical employed is a soluble ammonium ion source or a soluble di- or trivalent cation source, with the di- or trivalent metal salts being preferred. Representative examples of such salts which are suitable in the process of the present invention include the soluble chlorides, nitrates, hydroxides, and sulfates of magnesium, iron, calcium, barium and aluminum, with the chlorides thereof being preferred and calcium chloride being especially preferred as yielding optimum results. It is preferable to use a fairly concentrated solution, e.g. 2–6 molar, since this minimizes the volume of liquid to be filtered. However, it can be added in solid form or in more dilute solutions and a satisfactorily filterable product still obtained.

The essence of the process of the present invention is a unique sequential reaction between the three above chemicals in the environment of the system being treated which produces a complex which entraps or complexes with the suspended solids and even some solutes in the liquid system being treated and which is readily separated by filtration. By conducting the process in pure water, one can see that a unique, somewhat clear suspension of particles are created which are always readily filterable. This unique reaction occurs only when the above three chemicals are combined in the proper sequence. Preferably, the first chemical is added first followed by the addition of the second chemical, since the silicates rapidly deteriorate and, in the presence of many wastes, gelatinize or otherwise react becoming unavailable for combination with the aluminates. The third chemical must be combined with the first two chemicals in the environment of the liquid system since it is upon the addition of the third chemical that the unique complex is formed in situ to entrap or complex with the solids and solutes in the liquid system. It is possible to conduct the process of the present invention with a di- or trivalent cation being already present in the system in relatively minor amounts. If substantial amounts of di- or trivalent cation are present in a system, the system first should be made basic so as to tie cations up as precipitated hydroxides, thereby effectively eliminating any substantial concentrations of the cations from the system.

It has been found that specific amounts of the three chemicals should be available for reaction to yield formation of the unique complex with satisfactory separability thereof from the liquids. Thus, for every liter of the liquid system to be treated, there should be from about 0.004 to 0.04, preferably 0.01 to 0.02 moles of available soluble aluminate, from about 0.006 to 0.2, preferably 0.01 to 0.1 moles of available soluble silicate, and from about 0.001 to 0.2, preferably 0.01 to 0.04 moles of available soluble ammonium ion source or soluble di- or trivalent cation source. If substantially lesser amounts of the three chemicals are employed, the desired separability of the unique complex from the liquid does not result. If substantially greater amounts of the aluminate or the ammonium ion or cation source are employed, the excess amount will tend to remain in the effluent liquid when the unique complex is separated therefrom. If a substantially greater amount of the silicate is employed, it will cause a polymerization reaction which does not yield the unique complex upon the combination of the ammonium ion or cation source therewith and which is not easily separable from the liquid. Further, because of the stoichiometry of the sequential reaction of the three chemicals, the relative amounts of the chemicals used should be selected from about corresponding areas of the above ranges, i.e., within the above ranges, as lesser or greater amounts of one of the chemicals are used, the amounts of the other chemicals should be decreased or increased accordingly for best results. However, this is least true for the di- or trivalent cation source since good results can be obtained using for example, 1/6 the amounts of the other reagents.

It is important to note that the above-specified amounts relate to the available amounts of the three chemicals. Thus, in treating liquid systems which do not contain any of these three chemicals, the above amounts should be added. However, in the event the liquid system contains one or more of these three chemicals, it will be necessary to alter the added amounts so that the total available amounts of these three chemicals are within the specified ranges. In the event that there are excess amounts of one or more of the three chemicals present in the liquid system, it is desirable to preliminarily treat the liquid system to reduce the available amounts of the chemical which is present in excess. Furthermore, when one or more of the chemicals are already present in the liquid system, appropriate steps should be taken to maintain the sequence of combination of the three chemicals as delineated above. For example, if calcium chloride is present in the liquid system, it will be necessary to either eliminate the available calcium cation before sequentially adding the first two chemicals or combine the first two chemicals before adding them to the liquid system, since if the aluminate is added to a system containing calcium chloride, for example, a reaction between these two chemicals will occur which will hinder the formation of the desired unique complex upon addition of the silicate. The former step is preferable. Premixing the first two chemicals is of only borderline effectiveness and must be done by first diluting the silicate in a slightly acid solution, then mixing in aluminate and then introducing the two into the system. The aluminate and silicate cannot be mixed in concentrated form since they form an immediate gel.

The chemicals are rapidly added directly to the liquid system to be treated with agitation or mixing after each addition. The requirement for agitation or mixing is to insure complete dispersion of the chemicals and uniform formation of the unique complex. Although the particular speed of mixing is not critical, it has been found that between about 200 and 2,000 rpm's are preferred. Further, it is desirable to avoid high shear mixing after the addition of the third chemical since high shear mixing tends to hinder the formation of the unique complex upon the addition of the third chemical. The length of time between different additions seems not particularly critical, although no more than one to a few minutes are required to effect addition of all chemicals.

The unique sequential chemical reaction is essentially independent of temperature with process temperatures from 0° to 100° C. being suitable. Further, the reaction is rapid, taking less than about 30 seconds for complete formation of the unique complex after the addition of the third chemical.

It has been found that for the proper sequential reaction to occur, the pH of the liquid system must be at least 5.5 after the addition of the aluminate. Thus, in treating liquid systems which have an initial pH above 5.5 or those the pH of which will be raised above 5.5 upon the addition of the aluminate, no pH adjustments need be made.

However, in the case of very acidic liquid systems or systems buffered below a pH of 5.5, an initial pH adjustment must be made, e.g., with sodium hydroxide or other base, to raise the pH to a level where it will be above 5.5 after the addition of the aluminate. It has also been found that a slight amount of sodium chloride should be present in the system for optimum results, but this occurs naturally under most circumstances.

After the three chemicals have been sequentially combined as described above, the sequential reaction progresses to the formation of the unique complex. The resulting complex can be immediately separated from the liquid by conventional techniques, e.g., filtration. The filtrability of the complex is excellent, with the complex releasing much of the entrapped liquid upon filtration. The resulting filtrate is a clear, liquid which has no suspended solids present and has a decreased solute content. The resulting filter cake contains all of the solids from the liquid system treated, will not leach, and is semi-dry. For example, with a starting aqueous system having 30 per cent settleable solids only approximately 5 per cent of the water remains in the filter cake immediately after filtration.

The filtering media used could be any conventional media. Paper, cloth and sand filters are examples.

The effluent liquid and separated solids are then available for reuse, reprocessing for other uses, storage, discharge to the environment, or further refinement. For example, any minor amount of colorants or other solutes in the effluent liquid can be removed by subsequent carbon or ion exchange resin bed treatment to produce a colorless liquid. In the treatment of aqueous systems, for example, the separated solids quickly lose additional water upon air drying and shrink in volume several times yielding a hard, odorless, heat-resistant, and water-resistant product which does not support combustion. Thus, this resulting solid product can then be used for a variety of applications, such as in construction materials, road-paving materials, fertilizer, land fill and economic recovery of chemicals in waste.

It should be pointed out that the unique sequential chemical reaction between the three chemicals is not dependent upon any particular type of constitutents being present in the liquid system being treated. The three chemicals react with themselves, and thus the unique sequential reaction will take place even in distilled water. This has the advantage that the process can be used to treat extremely dilute waste systems and the chemicals themselves will not contaminate the effluent liquid. Further, additives to the liquid system prior to treatment by the process will not hinder the unique sequential reaction. For example, in the case of waste waters, it may be desirable to add a disinfectant such as chlorine to the waste waters to minimize the health hazard during the time prior to treatment by the present process and such an addition would not detract from the effectiveness of the inventive process.

The following examples further illustrate the process of the present invention:

EXAMPLES 1–5

Five 100 ml samples of human waste sludge typical in composition and concentration of the sludge contained in recreational vehicle holding tanks are treated according to the process of the present invention. Each of the five samples contains approximately 40 per cent settleable solids, 3,300 ppm $PO_4^=$, 390 ppm $NH_4^+$, 100,000 to 400,000 ppm BOD and 2,000 to 8,000 BOD as soluble organics. To each of the five samples are added sequentially 265 mg of sodium aluminate, 261 mg. of sodium silicate, and 200 mg of calcium chloride. The sodium aluminate is added by adding 0.4 ml of an aqueous sodium aluminate solution available from the Nalco Chemical Company of Chicago, Illinois identified as "Nalco 5-liquid Sodium Aluminate". The sodium silicate is added by adding 0.5 ml of an aqueous sodium silicate solution available from the Philadelphia Quartz Company of Philadelphia, Pennsylvania identified as sodium silicate solution "N" and having a $SiO_2$/$Na_2O$ weight ration of 3.22 and a Be value of 41°. The calcium chloride is added by adding 0.5 ml of an aqueous solution of calcium chloride having a concentration of 400g/l. The addition of the three chemicals to each of the samples is accompanied by continued mixing at speeds as indicated in Table I below. In each case, the pH of the samples is greater than 5.5 after the addition of the aluminate. In example 5, 10 ml of "Chlorox" are added prior to the sequential addition of the three chemicals. Thirty seconds after the addition of calcium chloride, the mixing is stopped and the samples are vacuum filtered through No. 41, 150 cm. Whatman filter paper. The filtrates are then passed through a carbon bed and the solids are air dried for 24 hours. The results are given in Table I wherein TOC represents "Total Organic Carbon" and SS represents "suspended solids", as measured by IR analysis.

EXAMPLES 6–29

Twenty-four 100 ml samples of human waste sludge of about the same composition as those treated in Examples 1–5 are treated according to the process of the present invention. To each of the samples are added sequentially 265 mg of the sodium aluminate of Examples 1–5, 261 mg of the sodium silicate of Examples 1–5, and the number of mg of a soluble ammonium ion source or a soluble cation source as indicated in Table II. The addition of the three chemicals to each of the samples is accompanied by continued mixing at 560 rpm. Thirty seconds after the addition of the soluble cation source, the mixing is stopped and the samples are vacuum filtered through No. 41, 150 cm. Whatman filter paper. The moisture content of the filter cake is determined immediately after filtration and after air drying for 24 hours. The results are given in Table II:

Table II

| | | | | Filtrate (PPM) | | | | | Percent Dry Weight of Cake | |
|---|---|---|---|---|---|---|---|---|---|---|
| Example | Cation Source | Mg of Cation Source Added | Filtration Time (sec.) | TOC | BOD | SS | $PO_4^=$ | $NH_4^+$ | Immediately After Filtration | After 24 hours Air Drying |
| 6 | $Ca(OH)_2$ | 630 | 10 | 1,000 | 100 | 0 | 0 | 100 | 50 | 90+ |
| 7 | $CaSO_4$ | 630 | 10 | 1,000 | 100 | 0 | 0 | 100 | 50 | 90+ |
| 8 | $CaCl_2$ | 168 | 10 | 1,000 | 100 | 0 | 0 | 100 | 50 | 90+ |
| 9 | $MgSO_4$ | 420 | 10 | 1,000 | 100 | 0 | 0 | 100 | 50 | 90+ |
| 10 | $MgCl_2$ | 336 | 10 | 1,000 | 100 | 0 | 0 | 100 | 50 | 90+ |
| 11 | $Mg(NO_3)_2$ | 420 | 10 | 1,000 | 100 | 0 | 0 | 100 | 50 | 90+ |
| 12 | $FeCl_2$ | 630 | 10 | 1,000 | 100 | 0 | 0 | 100 | 50 | 90+ |
| 13 | $Fe(NO_3)_3$ | 630 | 10 | 1,000 | 100 | 0 | 0 | 100 | 50 | 90+ |
| 14 | $FeCl_3$ | 252 | 10 | 1,000 | 100 | 0 | 0 | 100 | 50 | 90+ |
| 15 | $Fe_2(SO_4)_3$ | 840 | 10 | 1,000 | 100 | 0 | 0 | 100 | 50 | 90+ |
| 16 | $Al_2(SO_4)_3$ | 840 | 10 | 1,000 | 100 | 0 | 0 | 100 | 50 | 90+ |
| 17 | $Al_2(SO_4)_3(NH_4)_2SO_4$ | 840 | 10 | 1,000 | 100 | 0 | 0 | 100 | 50 | 90+ |
| 18 | $AlCl_3$ | 336 | 10 | 1,000 | 100 | 0 | 0 | 100 | 50 | 90+ |
| 19 | $Al(NO_3)_3$ | 630 | 10 | 1,000 | 100 | 0 | 0 | 100 | 50 | 90+ |
| 20 | $Ba(OH)_2$ | 630 | 10 | 1,000 | 100 | 0 | 0 | 100 | 50 | 90+ |
| 21 | $Ba(NO_3)_2$ | 420 | 10 | 1,000 | 100 | 0 | 0 | 100 | 50 | 90+ |
| 22 | $CoSO_4$ | 630 | 10 | 1,000 | 100 | 0 | 0 | 100 | 50 | 90+ |
| 23 | $Cd(NO_3)_2$ | 630 | 10 | 1,000 | 100 | 0 | 0 | 100 | 50 | 90+ |
| 24 | $SrCl_2$ | 336 | 10 | 1,000 | 100 | 0 | 0 | 100 | 50 | 90+ |
| 25 | $CuSO_4$ | 630 | 10 | 1,000 | 100 | 0 | 0 | 100 | 50 | 90+ |
| 26 | $CaNO_3$ | 630 | 10 | 1,000 | 100 | 0 | 0 | 100 | 50 | 90+ |
| 27 | $NH_4HCO_3$ | 1,260 | 10 | 1,000 | 100 | 0 | 0 | 100 | 50 | 90+ |
| 28 | $NH_4Cl$ | 630 | 10 | 1,000 | 100 | | | | 50 | 90+ |
| 29 | $(NH_4)_2SO_4$ | 840 | 10 | 1,000 | 100 | | | | 50 | 90+ |

In each case, immediately after filtration, the solids contain less than 5 per cent of the starting water, which is reduced to less than 3 per cent after 24 hours of air drying. Further, upon the air drying, the solids shrink to several times less than their volume immediately after filtration.

EXAMPLES 30–35

Six 100 ml samples of human waste sludge of about the same composition as those treated in Examples 1–29 are treated according to the process of the present invention following the procedure of Examples 6–29. To each of the samples are added sequentially 265 mg of the sodium aluminate of Examples 1–5, and the type and number of mg of silicate as indicated in the table, and 201 mg calcium chloride. The results are given in Table III:

Table I

| | | | Filtrate Before Carbon (PPM) | | | | Filtrate After Carbon | |
|---|---|---|---|---|---|---|---|---|
| Example | Mix Speed (RPM) | Filtration Time (sec.) | TOC | SS | $PO_4^=$ | $NH_4^+$ | BOD | TOC (PPM) |
| 1 | 200 | 10 | 1,000 | 0 | 0 | 100 | 100 | 100 |
| 2 | 560 | 10 | 1,000 | 0 | 0 | 90 | 100 | 50 |
| 3 | 1,200 | 10 | 1,000 | 0 | 0 | 100 | 100 | 100 |
| 4 | 1,850 | 10 | 1,000 | 0 | 0 | 100 | 100 | 100 |
| 5 | 560 | 10 | 1,000 | 0 | 0 | 100 | 100 | 100 |

Table III

| Example | SiO₂/Na₂O Weight Ratio | Percent SiO₂/Na₂O | SiO₂/K₂O Weight Ratio | Percent SiO₂/K₂O | °Be' | Specific Gravity | Mg. of Aluminate Added | Filtration Time (sec.) | Filtrate (PPM) TOC | BOD | SS | PO₄⁼ | NH₄⁺ | Percent Dry Weight of Cake Immediately After Filtration | After 24 hours Air Drying |
|---|---|---|---|---|---|---|---|---|---|---|---|---|---|---|---|
| 30 | 3.22 | 38.6 | — | — | 42.2 | 1.41 | 564 | 10 | 1,000 | 100 | 0 | 0 | 100 | 50 | 90+ |
| 31 | 2.88 | 42.7 | — | — | 47 | 1.48 | 645 | 10 | 1,000 | 100 | 0 | 0 | 100 | 50 | 90+ |
| 32 | 1.6 | 51.2 | — | — | 58 | 1.68 | 867 | 10 | 1,000 | 100 | 0 | 0 | 100 | 50 | 90+ |
| 33 | — | — | 2.5 | 29.1 | 30 | 1.26 | 375 | 10 | 1,000 | 100 | 0 | 0 | 80 | 50 | 90+ |
| 34 | — | — | 2.2 | 29 | 30 | 1.25 | 375 | 10 | 1,000 | 100 | 0 | 0 | 80 | 50 | 90+ |
| 35 | — | — | 2.1 | 39 | 40 | 1.38 | 660 | 10 | 1,000 | 100 | 0 | 0 | 80 | 50 | 90+ |

EXAMPLES 36–38

Three 100 ml samples of a pulp paper mill lagoon sludge are treated according to the process of the present invention following the procedure of Examples 6–29. Each sample contains 30 per cent settleable solids, 1.85 per cent dry weight, approximately 30,000–300,000 BOD and has a pH of 7.0. Prior to treatment, the sludge is non-filterable in 10 minutes (Whatman 150 cm No. 41). To each of the three samples, with continuous mixing at 560 rpm, are added sequentially 265 mg of the sodium aluminate of Examples 1–5, 367 mg of the sodium silicate of Examples 1–6, and 281 mg of calcium chloride. The samples are treated at 4°C., 25°C., and 100°C., respectively. The results are given in Table IV.

Table IV

| Example | Temperature °C. | Filtration Time (sec.) | Filtrate (PPM) TOC | BOD | SS | Percent Dry Weight of Cake Immediately After Filtration | After 24 hours Air Drying |
|---|---|---|---|---|---|---|---|
| 36 | 4° | 10 | 50 | 5 | 0 | 50 | 90+ |
| 37 | 25° | 10 | 40 | 4 | 0 | 50 | 90+ |
| 38 | 100° | 10 | 50 | 5 | 0 | 50 | 90+ |

EXAMPLES 39–41

Three 100 ml aqueous plating waste samples, neutralized as hydroxides, hexavalent chromate reduced, are treated according to the process of the present invention following the procedure of Examples 6–29. To each of the samples, with mixing at 560 rpm, are added sequentially 265 mg of the sodium aluminate of Examples 1–5, 523 mg of the sodium silicate of Examples 1–5, and 400 mg of calcium chloride. The results are given in Table V:

Table V

| Example | Percent Dry Weight of Sample | Metals Present as the Hydroxide | Si (PPM) | Al (PPM) | Filtration Time (sec.) | pH | Fe | Cu | Cr | Ni | Si | Al | Ca | Percent Dry Weight of Cake Immediately After Filtration | After 24 hours Air Drying |
|---|---|---|---|---|---|---|---|---|---|---|---|---|---|---|---|
| 39 | 8 | Al, Ni, Cu, Fe, Sn | 24 | 18 | 10 | 8 | <1 | 1.5 | 0.1 | 0.8 | 0.1 | 2 | 5 | 40+ | 70+ |
| 40 | 8 | Al, Cu, Zn, Fe, Sn | 1,000 | 420 | 10 | 8 | <1 | 1.0 | 1 | 1 | 1 | 1 | 5 | 40+ | 70+ |
| 41 | 7 | Al, Ni, Cu, Fe, Zn | 30 | 20 | 10 | 8 | <1 | 2 | 1 | 1 | 1 | 1 | 5 | 40+ | 70+ |

EXAMPLES 42–43

Two 100 ml samples of a biological and chemical pharmaceutical sludge are treated according to the process of the present invention following the procedure of Examples 6–29. Settleable solids, which are non-filterable, are 100 per cent which are 80 per cent when diluted 1:1, and have a 30 per cent dry weight. To each of the samples, the sample of Example 43 having been diluted 1:1 with water, are added sequentially 265 mg sodium aluminate, 525 mg sodium silicate, and 400 mg calcium chloride, with continuous mixing at 1,000 rpm. The results are given in Table VI below:

Table VI

| Example | Filtration Time (sec.) | Filtrate (PPM) TOC | SS | Percent Dry Weight of Cake Immediately After Filtration | After 24 hrs. Air Drying |
|---|---|---|---|---|---|
| 42 | 20 | less than 50 | 0 | 50 | 90+ |
| 43 | 10 | less than 50 | 0 | 50 | 90+ |

Another series of tests were conducted on a synthetic sludge to determine the effect of variations in the sequence of addition of the three chemicals on the filtration times achieved. The synthetic sludge comprises a mixture of insoluble metal hydroxides, thereby simulating a plating waste sludge. Zinc, copper, nickel and chromium chlorides were dissolved in water and the resulting solution made basic (pH8) by the addition of sodium hydroxide. The molar concentrations of the metal salts prior to precipitation with hydroxide is given in Table VII below. The precipitation provided approximately equal amounts of the hydrous oxides of each metal. The concentration of filterable solids from the synthetic sludge was 64,300 ppm based on their weight after oven drying at 150°C overnight.

aqueous sludge. Filtration times were recorded from the start of the vacuum pump. Two times were recorded. One was the time which it took for the filter cake to show visible signs of cracking. The second was the time which it took for the vacuum to drop to 5 inches of mercury. The first is referred to in Table VIII as Filtration Time A and the second is referred to as Filtration Time C. The aluminate added is referred to by the Roman numeral I, the silicate is referred by the Roman numeral II and the di- or trivalent cation source, in this case calcium chloride, is referred to with the Roman numeral III. The chemicals were added to the system in the amounts set forth in examples 1 through 5 herein. The results for the various sequences of addition are shown in Table VIII below:

Table VIII

| Run | Kelmik Sequence[a] | Changes in sequence of addition[a] | | | 72 hour Weight loss, g. |
|---|---|---|---|---|---|
| | | Filtration A | Time, sec. C[b] | Filter Cake Initial Weight, g. | |
| 1 | None[c] | 240 | 500+ | — | — |
| 2 | None[c] | 235 | 500+ | — | — |
| 3 | I-II-III | 87 | 110 | 24.62 | 9.4 |
| 4 | I-II-III | 125 | 130 | 24.11 | 9.2 |
| 5 | I-III-II | 400 | 460 | 27.14 | 12.9 |
| 6 | II-I-III | 168 | 500+ | 18.52 | 11.1 |
| 7 | II-III-I | 170 | 500+ | 17.90 | 10.8 |
| 8 | III-I-II | 420 | 500+ | 27.36 | 18.5 |
| 9 | III-II-I | 155 | 215 | 25.41 | 17.1 |
| 10 | II-III | 125 | 500+ | — | — |
| 11 | I-II | 700+ | — | — | — |
| 12 | I-III | 270 | 500+ | — | — |

[a] 50 ml. sludge diluted to 250 ml. with tap water.
[b] pressure drop to 5" Hg was not observed at times of greater than 500 sec. for those runs recorded as 500+.
[c] No chemicals added.
[d] 1.0 ml. of aluminate solution, 1.25 ml. of silicate solution, and 1.25 ml. of calcium chloride solution was used.

TABLE VII

| Salt or Hydroxide of | Molar Composition of Synthetic Sludge | |
|---|---|---|
| | Solution A | Solution B |
| Zinc | 0.123 M | 0.125 M |
| Copper | 0.126 | 0.126 |
| Nickel | 0.134 | 0.133 |
| Chromium | 0.132 | 0.133 |
| Total | 0.515 M | 0.517 M |

After thorough mixing, 50 milliliters of a representative sample of the synthetic sludge was added to a beaker and diluted by adding 200 milliliters of water. The resulting mixture was stirred in a mechanical stirrer. The chemicals of the present invention were added with stirring and the time recorded. At 30 seconds following the addition of the last chemical, the stirrer was removed from the beaker and the treated waste was added with mixing to a 9 centimeter Buchner filter funnel on a 1 liter filter flask. Filter paper E-D number 613 was used. Vacuum filtration commenced with the start of a vacuum pump, set for a vacuum of 15 inches of mercury when the Buchner funnel contained the Of course it will be obvious to those skilled in the art that various modifications may be made in the process of the present invention depending on the particular waste treated without departing from the scope or spirit of the invention. The approach of the present invention is so radical from prior art sedimentation or ion exchange systems that it has been impossible to test it in all possible applications. However, the invention appears applicable with only minor variations requiring only modest testing in such diverse waste systems as plating wastes, human wastes, car wash wastes, commercial laundry wastes and sludge wastes from water treatment plants.

The embodiments of the invention in which an exclusive property or privilege is claimed are defined as follows:

1. A process for purifying a waste water system comprising the steps of: forming filterable solids by sequentially adding to the waste water system, with agitation in the waste water system, first from about 0.004 to 0.04 moles of an alkali aluminate per liter of said waste water system, secondly from about 0.006 to 0.2 moles of an alkali silicate per liter of said waste water system, and third from about 0.001 to 0.2 moles of at least one of (a) a soluble ammonium ion source and (b) a soluble di- or trivalent cation source, selected from the group consisting of the cations of calcium, magnesium, iron, aluminum, barium, cobalt, cadmium, strontium and copper, per liter of said waste water system, followed by filtering the solids from the waste water system; and insuring that the pH of the system is greater than about 5.5 upon said addition of said alkali aluminate.

2. The process according to claim 1 wherein said di- or trivalent cation source is a metal salt selected from the group of metal salts consisting of the soluble chlorides, nitrates, hydroxides, and sulfates of magnesium, iron, calcium, barium and aluminum and mixtures of said metal salts.

3. The process according to claim 2 wherein said alkali aluminate is sodium aluminate, said alkali silicate is sodium silicate, and said metal salt is calcium chloride.

4. The process according to claim 3 wherein from about 0.01 to 0.02 moles of sodium aluminate, from about 0.01 to 0.1 moles of sodium silicate, and from about 0.01 to 0.04 moles of calcium chloride are sequentially added per liter of said waste water system.

5. The process according to claim 1 in which said agitation of the system during addition of said one of said soluble ammonium ion source and soluble di- or trivalent cation source is low shear agitation.

6. The process of claim 1 in which said alkali silicate is added as a solution of about 5 molar concentration.

7. The process according to claim 1 in which said sequential addition steps are conducted rapidly.

8. The process of claim 7 in which said agitation is conducted by operating a mixer at 200 to 2,000 RPM.

9. The process of claim 1 in which said agitation is conducted by operating a mixer at 200 to 2,000 RPM.

10. A process for purifying a contaminated waste water system comprising the steps of: forming filterable solids by sequentially adding to the waste water system, with agitation in the system, first, a sufficient amount of alkali aluminate to yield from about 0.004 to 0.04 moles of available alkali aluminate per liter of said waste water system; secondly, adding a sufficient amount of alkali silicate to yield from about 0.006 to 0.2 moles of available alkali silicate per liter of said waste water system; and third, adding from about 0.001 to 0.2 moles of one of a soluble ammonium ion source or di- or trivalent cation source, selected from the group consisting of the cations of calcium, magnesium, iron, aluminum, barium, cobalt, cadmium, strontium and copper, per liter of said waste water system; followed by filtering the solids from said system; and insuring that the pH of the system is greater than about 5.5 upon said addition of said alkali aluminate.

11. The process according to claim 10 wherein amounts of said alkali aluminate and said alkali silicate are sequentially added to said aqueous system to yield from about 0.01 to 0.02 moles of available alkali aluminate and from about 0.01 to 0.1 moles of available alkali silicate; and then adding from about 0.01 to 0.04 moles of said ammonium ion source or di- or trivalent cation source per liter of said waste water system.

12. A process for purifying a waste water system containing a substantial amount of an alkali aluminate comprising: the steps of forming filterable solids by sequentially adding to the liquid system, with agitation in the liquid system, from about 0.006 to 0.2 moles of an alkali silicate per liter of said waste water system and from about 0.001 to 0.2 moles of at least one of (a) a soluble ammonium ion source and (b) a soluble di- or trivalent cation source selected from the group consisting of the cations of calcium, magnesium, iron, aluminum, barium, cobalt, cadmium, strontium and copper, per liter of said waste water system, followed by filtering the solids from the waste water system; and insuring that the pH of the system is greater than about 5.5 prior to the addition of said alkali silicate.

13. A process for purifying a waste water system containing a source of soluble di- or trivalent cations comprising: forming filterable solids by first rendering the waste water system basic so as to substantially precipitate the source of di- or trivalent cations; then sequentially adding to the waste water system, with agitation in the waste water system, first from about 0.004 to 0.04 moles of an alkali aluminate per liter of said waste water system, secondly from about 0.006 to 0.2 moles of an alkali silicate per liter of said waste water system and third from about 0.001 to 0.2 moles of at least one of (a) a soluble ammonium ion source and (b) a soluble di- or trivalent cation source selected from the group consisting of the cations of calcium, magnesium, iron, aluminum, barium, cobalt, cadmium, strontium and copper, per liter of said waste water system, followed by filtering the solids from the waste water system; and insuring that the pH of the system is greater than about 5.5 upon addition of said alkali aluminate.

14. A process for purifying waste water systems, comprising: forming a filterable solid by first adding from about 0.004 to 0.04 moles of an alkali aluminate per liter of waste water system to a dilute, slightly acidic alkali silicate solution containing from about 0.006 to 0.2 moles of alkali silicate per liter of said waste water system, followed by immediately adding the resulting mixture to said waste water system with agitation, followed by adding from about 0.001 to 0.2 moles of at least one of (a) a soluble ammonium ion source and (b) a soluble di- or trivalent cation source, selected from the group consisting of the cations of calcium, magnesium, iron, aluminum, barium, cobalt, cadmium, strontium and copper, per liter of said waste water system, to said waste water system, with agitation, followed by filtering the resulting solids from said waste water system; and insuring that the pH of the system is greater than about 5.5 upon addition of said alkali aluminate.

* * * * *

UNITED STATES PATENT AND TRADEMARK OFFICE
CERTIFICATE OF CORRECTION

PATENT NO. : 3,928,195
DATED : December 23, 1975
INVENTOR(S) : James B. Hoeltgen and Harold E. B. Humphrey It is certified that error appears in the above-identified patent and that said Letters Patent are hereby corrected as shown below:

Column 2, line 23:

"requies" should be ---requires---

Column 9-10, Table V:

Under "Metals Present as the Hydroxide"

should be as follows:

Al, Zn, Ni,
Cu, Fe, Sn

Al, Cu, Zn,
Fe, Sn

Al, Ni, Cu,
Fe, Zn

Signed and Sealed this fourth Day of May 1976

[SEAL]

Attest:

RUTH C. MASON
Attesting Officer

C. MARSHALL DANN
Commissioner of Patents and Trademarks